United States Patent
Hu et al.

(10) Patent No.: US 7,329,065 B2
(45) Date of Patent: Feb. 12, 2008

(54) COUPLING ASSEMBLY AND METHOD FOR CONNECTING AND DISCONNECTING A SHAFT ASSEMBLY

(75) Inventors: Xiaobing Hu, Rochester, NY (US); Anthony C. Kocienski, Rochester, NY (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 10/981,634

(22) Filed: Nov. 5, 2004

(65) Prior Publication Data
US 2006/0099028 A1    May 11, 2006

(51) Int. Cl.
F16D 1/112    (2006.01)
F16D 1/116    (2006.01)

(52) U.S. Cl. ............... 403/349; 366/331; 403/348; 403/350; 416/244 R

(58) Field of Classification Search ........ 403/348–350, 403/306; 416/170 R, 244 R; 415/216.1; 417/423.6; 366/331
See application file for complete search history.

(56) References Cited

U.S. PATENT DOCUMENTS

| | | | | |
|---|---|---|---|---|
| 3,125,363 A | * | 3/1964 | Kapusta | 403/1 |
| 3,266,200 A | * | 8/1966 | Block | 451/509 |
| 4,176,815 A | * | 12/1979 | Davidson et al. | 248/589 |
| 4,578,608 A | * | 3/1986 | Mech et al. | 310/112 |
| 5,203,574 A | * | 4/1993 | Stolzenfeld | 277/423 |
| 6,290,423 B1 | * | 9/2001 | Jungkind | 403/322.1 |
| 6,302,617 B1 | * | 10/2001 | Rumpp | 403/348 |
| 2005/0063772 A1 | * | 3/2005 | Bladen | 403/348 |
| 2005/0123346 A1 | * | 6/2005 | Nakamura et al. | 403/348 |

FOREIGN PATENT DOCUMENTS

| | | |
|---|---|---|
| DE | 2260914 A1 | 6/1974 |
| DE | 20205371 U1 | 10/2002 |
| EP | 1 338 801 A1 | 8/2003 |
| FR | 2685415 A1 * | 6/1993 |
| GB | 2113802 A | 8/1983 |
| WO | WO 2004/082875 A1 | 9/2004 |

OTHER PUBLICATIONS

Search Report Under Section 29, completed on May 24, 2006.

* cited by examiner

*Primary Examiner*—Daniel P. Stodola
*Assistant Examiner*—Joshua T Kennedy
(74) *Attorney, Agent, or Firm*—Baker & Hostetler LLP

(57) ABSTRACT

A coupling assembly that can be used to quickly connect and disconnect an impeller shaft to and from a drive output shaft. A portion of the coupling assembly can be used to secure the impeller shaft inside a mixing vessel so that the impeller shaft can remain secure inside the mixing vessel when the drive is disconnected. The coupling assembly has a first and a second coupling half, a first group of locking pens that extend from the first coupling half and can pass through openings formed in the second coupling half, and second group of locking pins that extend from the first coupling half and can pass through openings formed in the top region of the mixing vessel.

13 Claims, 4 Drawing Sheets

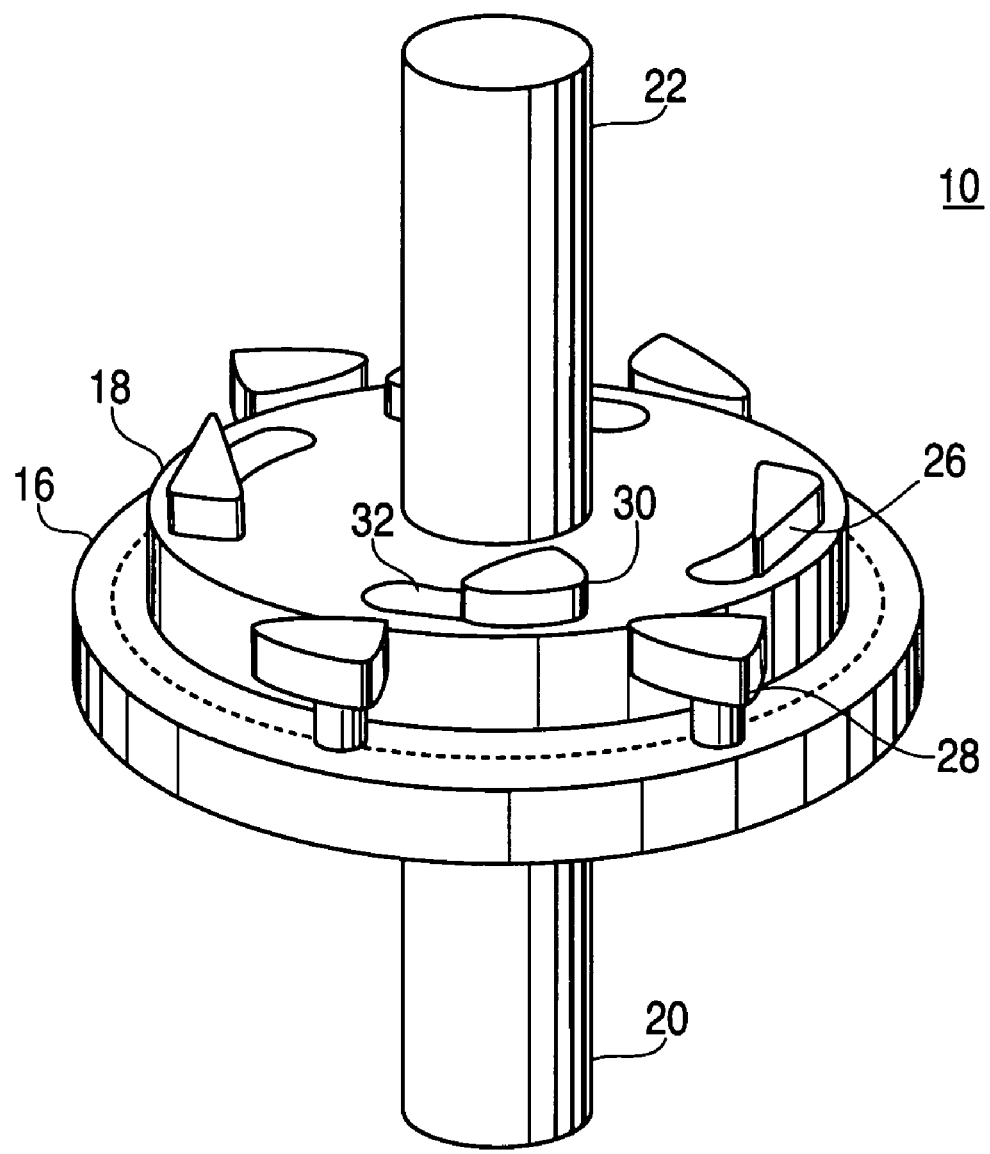

COUPLING ASSEMBLY AND METHOD FOR CONNECTING AND DISCONNECTING A SHAFT ASSEMBLY

FIELD OF THE INVENTION

The present invention relates generally to the field of couplings, for example, couplings that connect an impeller shaft to a drive output shaft. More particularly, the present invention relates to couplings that can be used to quickly connect and disconnect an impeller shaft to and from a drive output shaft.

BACKGROUND OF THE INVENTION

Mixing devices are in wide use in industry, and many mixing devices include a large mixing vessel which contains a liquid to be mixed, and a typically vertical impeller shaft running down some or all of the vertical length inside the mixing vessel. The impeller shaft is typically rotatably driven by a motor output shaft, usually located at the top of the mixing vessel, and at one or several locations on the length of the impeller shaft radially extending impellers are mounted which have paddles or blade type features along some or all of the length and which mix and/or otherwise impart energy to the fluid inside the mixing vessel.

In some instances, a drive assembly along with some sealing arrangement are mounted at a top opening of the mixing vessel. Often times, the bottom end of the drive output shaft and the top end of the impeller shaft are each fitted with a coupling half, and the two coupling halves are bolted directly together in order to suspend the impeller shaft from the drive so that it extends vertically downward into the mixing vessel.

A disadvantage to this arrangement is that it is relatively permanent and once the drive output shaft's coupling half is bolted to the impeller shaft's coupling half, it is now difficult to then go back and disconnect the two without time consuming and disadvantageous unbolting processes. Therefore, these bolting systems are not very suitable for use in processes where it is often necessary to disconnect the motor output shaft from the impeller shaft in order to disconnect the drive from the rest of the mixing assembly. For example, sterile mixing assemblies are sometimes required in the biotech and pharmaceutical industry, and a known way to provide a sterile mixing assembly is place a mixing assembly into an autoclave where it is sterilized. However, the mixing assembly's drive is removed before the rest of the mixing assembly is placed into the autoclave. Because this known sterilization process involves removing the drive, the foregoing time consuming unbolting and bolting processes may be undesirable.

Accordingly, there is a need in the art for a coupling apparatus and method which can be fitted onto a drive output shaft and onto an impeller shaft, and which can be used to quickly connect and disconnect the shafts to and from each other.

SUMMARY OF THE INVENTION

The foregoing needs are met, to a great extent, by the present invention, wherein in one aspect an apparatus is provided that in some embodiments provides an apparatus and method which can be fitted onto a drive output shaft and onto an impeller shaft, and which can be used to quickly connect and disconnect the shafts to and from each other. Thus, enabling a drive to be quickly connected and disconnected to and from a mixing assembly.

In accordance with one aspect of the present invention a coupling assembly is provided for connecting and disconnecting a shaft assembly. The coupling assembly comprises a first coupling half having a first set of locking pins and a second coupling half having a plurality of openings configured to receive the first set of locking pins to connect the first and second coupling halves. The first set of locking pins has a first flanged portion, and the first flanged portion overlaps the second coupling half when the first and second coupling halves are in an engaged position.

In accordance with another aspect of the present invention, a coupling assembly for connecting and disconnecting a shaft assembly is provided. The coupling assembly comprises a first coupling means having a first and a second set of locking means and a second coupling means having a plurality of openings configured to receive the first set of locking means to connect the first and second coupling means. The first set of locking means has a first flanged portion and the second set of locking means has a second flanged portion, and the first flanged portion overlaps the second coupling means when the first and second coupling means are in an engaged position.

In accordance with yet another aspect of the present invention, a method is provided for connecting a coupling assembly having a first coupling half and a second coupling half. The method comprises positioning the second coupling half having a plurality of openings proximate to the first coupling half having a first and a second set of locking pins, wherein the plurality of openings align with the first set of locking pins. Next, the method provides a step for translating the second coupling half such that the first set of locking pins pass through the plurality of openings. The next step is rotating the second coupling half in a first direction such that a first flanged portion of the first set of locking pins engages the second coupling half. The next step is further rotating the coupling assembly in a first direction such that a second flanged portion of the second set of locking pins disengages a ledge portion of a shaft support member.

In accordance with yet another aspect of the present invention, a method is provided for disconnecting a coupling assembly having a first coupling half and a second coupling half. The method comprises positioning the coupling assembly such that a second set of locking pins located on the first coupling half align with a plurality of passageways formed in a shaft support member, translating the coupling assembly such that the second set of locking pins pass through the plurality of passageways formed in the shaft support member, rotating the coupling assembly in a first direction such that a second flanged portion of the second set of locking pins engages a ledge portion of the shaft support member, further rotating the coupling assembly in a first direction such that a first flanged portion of the first set of locking pins disengages from the first coupling half and aligns with a plurality of openings formed in the second coupling half, and translating the second coupling half such that the first set of locking pins pass through the plurality of openings formed in the second coupling half.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 is a perspective view of the coupling assembly of FIG. 1 in a connected position.

DETAILED DESCRIPTION

An embodiment in accordance with the present invention provides an apparatus and method which can be fitted onto a drive output shaft and onto an impeller shaft, and which can be used to quickly connect and disconnect the shafts to and from each other. The present invention may be suitable for use in processes where it is often necessary to disconnect a drive output shaft from the impeller shaft in order to disconnect the motor from the rest of the mixing assembly. For example in the biotech industry, in order to provide a sterile mixing assembly, the mixing assembly's drive is removed and the rest of the mixing assembly is placed into an autoclave where it is sterilized.

Figure 1:
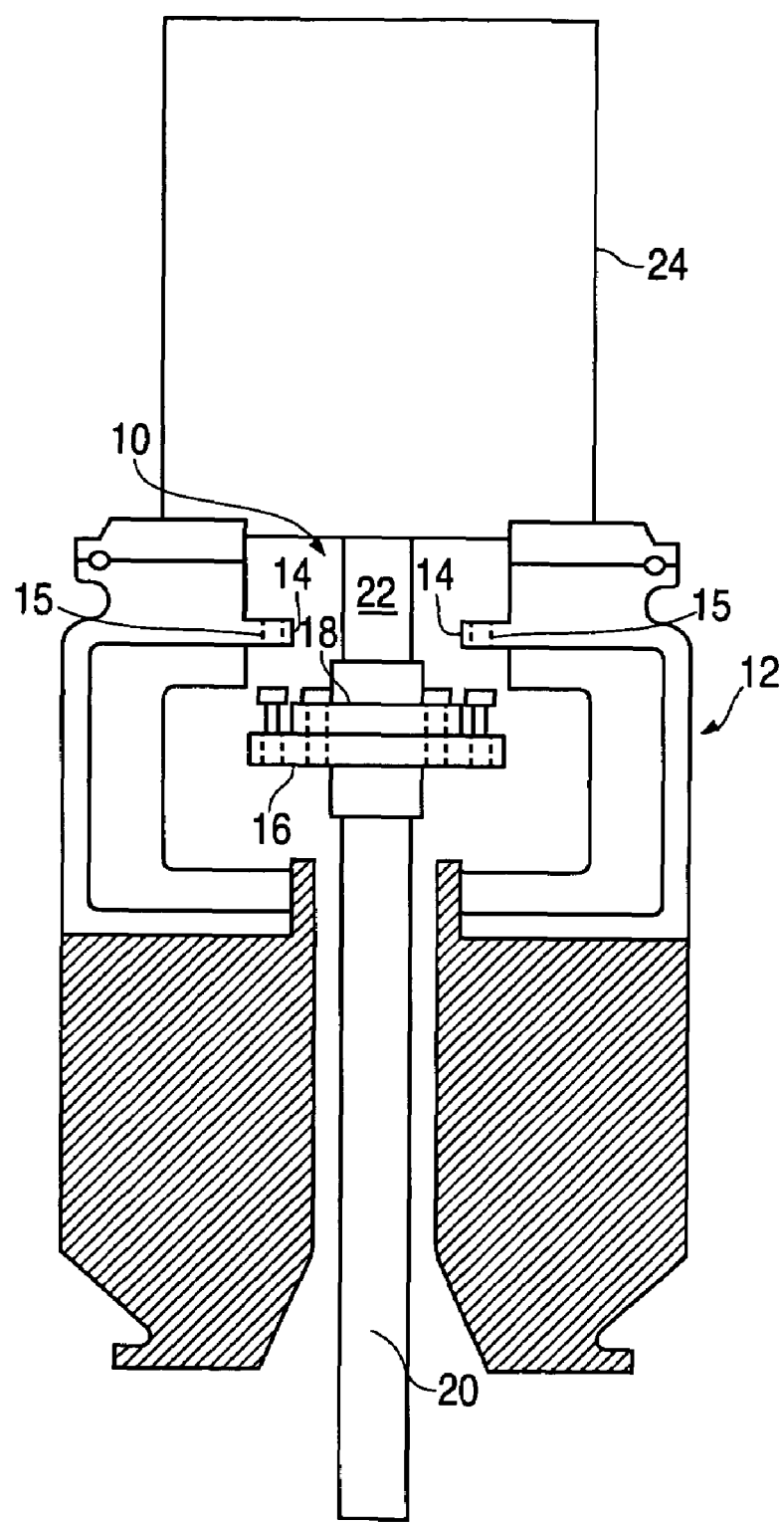
FIG. 1 is a cross sectional side view showing a coupling assembly in a connected position according to a preferred embodiment of the present invention.

Preferred embodiments of the invention will now be described with reference to the drawing figures, in which like reference numerals refer to like parts throughout. Turning to FIG. 1, a coupling assembly 10 is depicted in a configuration located within a housing 12. The housing 12 may be, for example, rested or otherwise mounted on a top region of a mixing vessel. In this example, the housing 12 contains a ledge 14 having passageways 15 formed therein. The coupling assembly 10 includes a first coupling half 16 and a second coupling half 18, wherein the first and second coupling halves 16, 18 are circular, and the diameter of the first coupling half 16 is larger than the diameter of the second coupling half 18.

The ledge 14 forms a continuous circle having a diameter larger than the diameter of the second coupling half 18 and smaller than the diameter of the first coupling half 16. Four passageways 15 are formed in the ledge 14, and each passageway 15 is separated by 90 degrees. In an alternative embodiment, the first and second coupling halves 16, 18 can be the same size and/or can be embodied in a shape other than a circle.

As shown in FIG. 1, the first coupling half 16 is integrally connected to an impeller shaft 20, and the second coupling half 18 is integrally connected to a drive output shaft 22. In this example, the drive output shaft 22 is connected to, and rotationally driven by, a motor 24 and/or a gear box. The drive 24 may be rested or otherwise mounted on a top region of the housing 12. The coupling assembly 10 connects the drive output shaft 22 to the impeller shaft 20 so that when the drive 24 drives the drive output shaft 22, the impeller shaft 20 is also driven. The impeller shaft 20 may be, for example, suspended in the inside region of the mixing vessel, and it is desired to mount radially extending impeller members such as paddles or blades onto the impeller shaft 20 so that rotation of the impeller shaft 20 will move the impellers through a fluid located in the mixing vessel.

Figure 2:
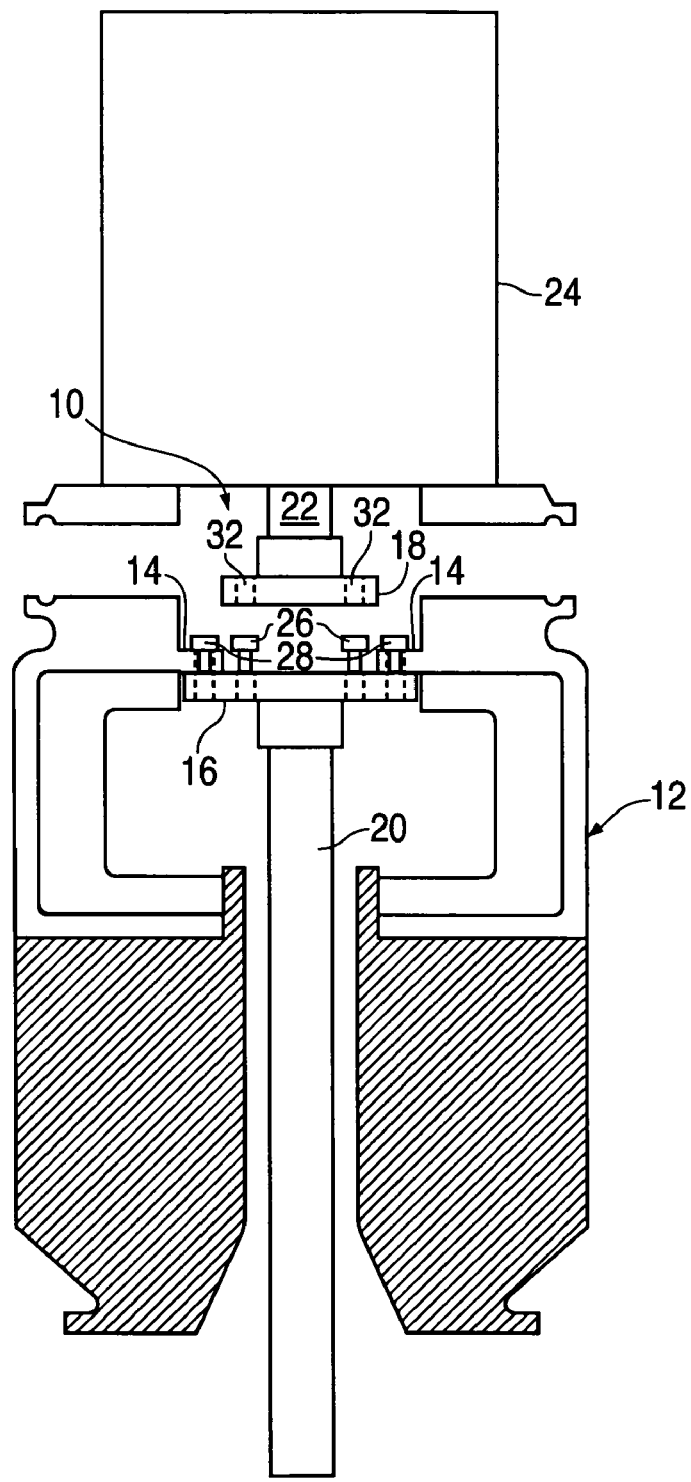
FIG. 2 is a cross sectional side view showing the coupling assembly of FIG. 1 in a disconnected position.

Turning now to FIG. 2, the coupling assembly 10 is shown in a disconnected position. Because the first coupling half 16 is integrally connected to the impeller shaft 20 and the second coupling half 18 is integrally connected to the drive output shaft 22, when the coupling halves 16, 18 are disconnected, the impeller shaft 20 and the drive output shaft 22 are thereby disconnected. Further, because the drive output shaft 22 is connected to the drive 24, when the coupling assembly 10 is disconnected, the drive 24 is disconnected from the impeller shaft 20. Upon the coupling assembly's disconnection, in the preferred embodiment, the drive 24 may be removed from atop the housing 12 and, thus, completely separated from the rest of the mixing assembly.

It is desirable to sterilize the impeller shaft 20 and the impeller members attached thereto along with the other mixer components. However, it is not desirable or feasible to sterilize the drive 24. Thus, the drive 24 is removed from the mixing assembly before sterilization begins. Because the impeller shaft 20 is attached to the drive 24, by way of the coupling assembly 10, it is desirable to provide a supporting means capable of supporting the impeller shaft 20 during sterilization and while the drive 24 is removed from the mixing assembly. The present invention provides the foregoing supporting means by providing a ledge 14 from which the impeller shaft 20 can hang when the drive 24 is removed from the mixing assembly. When the coupling assembly 10 is disconnected and the drive 24 is removed, the first coupling half 16 may be secured directly to the ledge 14, which is integrally connected to the housing 12. Thus, the first coupling half 16 and the impeller shaft 20 remain secure in the mixing assembly during sterilization in an autoclave, for example.

Figure 3:
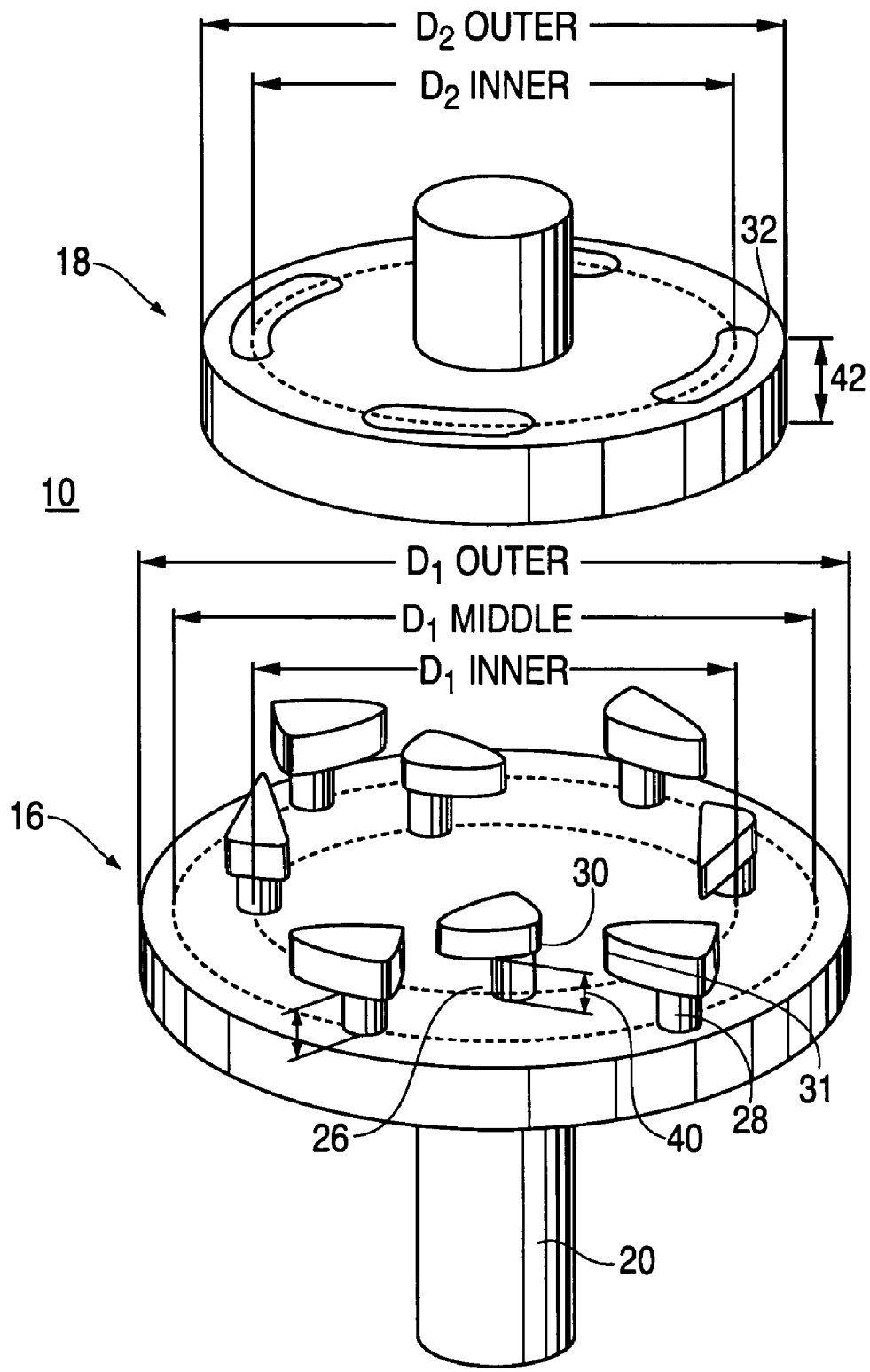
FIG. 3 is a perspective view of the coupling assembly of FIG. 1 in a disconnected position.

Referring now to FIG. 3, the first coupling half 16 has a first and a second set of locking pins 26, 28 extending therefrom, and in this example, the first locking pins 26 have a flanged portion 30 and the second locking pins 28 have a flanged portion 31. The first locking pins 26 are disposed in an inner diameter $D_{1\_inner}$, and the second locking pins 28 are disposed in a middle diameter $D_{1\_middle}$. The first coupling half 16 has an outside diameter $D_{1\_outer}$. The second coupling half 18 has a plurality of holes 32 formed therein that extend all the way through. The holes 32 are formed in an inner diameter $D_{2\_inner}$, wherein $D_{2\_inner}$ equals $D_{1\_inner}$.

Referring now to FIG. 4, because $D_{2\_inner}$ equals $D_{1\_inner}$, when the first and second coupling halves 16, 18 are connected, the first locking pins 26, which are disposed in $D_{1\_inner}$, pass through holes 32, which are formed in $D_{2\_inner}$. Further, the first set of locking pins' flanges 30 overlap and, thereby, engage the second coupling half 18.

Referring again to FIG. 2, when the two coupling halves 16, 18 are disconnected and the impeller shaft 20 is supported by the ledge 14, the first coupling half's 16 second set of locking pins 28 extend through the passageways 15 that are formed in the ledge 14. Further, the second set of locking pins' 28 flanges 31 overlap and, thereby, engage the ledge 14.

Referring again to FIG. 3, the second coupling half 18 has an outside diameter $D_{2\_outer}$, wherein $D_{2\_outer}$, is smaller than $D_{1\_outer}$ and $D_{1\_middle}$, yet $D_{2\_outer}$ is larger than $D_{1\_inner}$. The foregoing arrangement is so that the second coupling half 18 is large enough to accept the first set of locking pins 26, but too small to interfere with second set of locking pins 28. Thus, even when the first and second coupling halves 16, 18 are engaged, second locking pins 28 are free to pass through passageways 15 and engage the housing 12.

$D_{2\_outer}$ is smaller than the diameter of the circular opening formed by the ledge 15. The foregoing arrangement is to allow the second coupling half 18 to pass through the circular opening formed by the ledge 15 and, thus, the coupling assembly 10 can be lowered into the housing 12, as shown in FIG. 1. Once the coupling assembly 10 is lower into the housing 12, where it is free from contact with other mixing assembly components, the drive 24 can be activated and the mixing assembly can become functional.

The preferred method for connecting the coupling assembly 10 will now be described. If the impeller shaft 20 is secured to the ledge 14, the first step is to position the second coupling half 18 proximate to the first coupling half 16. The second coupling half 18 should be positioned such that its openings 32 align with the first coupling half's 16 first set of locking pins 26. The next step is to lower the second coupling half 18 so that the first set of locking pins 26 pass through the opening 32 and the mating surface 36 of the first coupling half 16 contacts the mating surface 38 of the second coupling half 18.

The next step is to rotate the second coupling half 18 in a first direction such that it slides underneath the flanged portions 30 of the first set of locking pins 26. The next step in the connecting process is to rotate the coupling assembly 10 further in the first direction. In an alternative embodiment, it is appreciated the coupling assembly 10 can be rotated in a second, opposite, direction instead of further rotated in the first direction. The preferred further rotation step slides the flanged portions 31 of the second set of locking pins 28 along the ledge portion 14 of the shaft support housing 12 until the flange portions 31 disengage from the ledge 14. The next step is to lower the coupling assembly 10 so the second set of locking pins 28 pass through the passageways 15. Finally, the coupling assembly 10 can be lowered through the continuous circle formed by the ledge 14 until the drive 24 is secure atop the housing 12.

The preferred method for disconnecting the coupling assembly 10 will now be described. The first step is to align the second set of locking pins 28 with the passageways 15 that are formed in the ledge 14. The second set of locking pins 28 should be aligned such that when the coupling assembly 10 is lifted toward the ledge 14, the second locking pins 28 pass through the passageways 15.

The next step in the disconnecting process is to lift the coupling assembly 10 until pins 28 pass through the passageways 15 and a portion of the first coupling half's 16 mating surface 36 makes contact with the bottom portion of the ledge 14. Once the second locking pins 28 are through the passageways 15, the next step is to rotate the coupling assembly 10 in a first direction such that the flanged portions 31 of the second set of locking pins 28 overlap and thereby engage the ledge 14.

Once the locking pins 28 have engaged the ledge 14, the second coupling half 18 is further rotated in the first direction such that the flanged portions 30 of the first set of locking pins 26 slide along the second coupling half 18 until the flanged portions 30 are no longer in contact with the second coupling half 18 and the first set of locking pins 26 are aligned with the openings 32. In an alternative embodiment, it is appreciated the second coupling half 18 can be rotated in a second, opposite, direction instead of further rotated in the first direction. The next step is to lift the second coupling half 18 such that the first pins 26 pass through the opening 32 and the second coupling 18 disconnects from the first coupling half 16.

Referring again to FIG. 3, the distance 40 between the first set of locking pins' 26 flanges 30 and the mating surface 36 of the first coupling half 16 is slightly larger than the thickness 42 of the second coupling half 18. Because there is minimum clearance between the two, the second coupling half 18 can be rotated underneath the first set of locking pins' 26 flanges 30, yet remain generally snug therewith. This generally snug relationship prevents the coupling assembly 10 from inadvertently disengaging.

The holes 32 extend all the way through the second coupling half 18 and are typically large enough such that the flanged portions 30 of the first set of locking pins 26 may easily pass through, without first having to be precisely aligned with the holes 32. Further, the locking pins 26 and the holes 32 are located at regular intervals such that they do not have to be specifically arranged prior to connection. Thus, connecting the coupling halves 16, 18 to one another may be readily accomplished.

In the preferred embodiment, the first set of locking pins 26 consists of four individual pins disposed at regular intervals of 90 degrees along the first coupling half 16. In the case of a coupling assembly 10 responsible for withstanding particularly large axial and rotational forces, it may be desirable to use a different number of locking pins to further distribute the force among the individual pins, such as eight pins each 45 degrees apart.

The coupling assembly 10 and the housing 12 may preferably be made of a metal such as a high alloy. These parts may be the same material or a similar material as the shafts 20, 22. The locking pins 26, 28 due to their desired frictional engagement with the second coupling half 18 and ledge 14, may preferably be manufactured from a softer metal than the other components.

It will also be appreciated that in the preferred embodiment, hinged locking pins 26, 28 are provided. Upon the locking pins 26, 28 passage through the passageways 15 and/or holes 32, the pins 26, 28 are moved about a hinge from a vertical position to a non-vertical position such that the first coupling half 16 is secured to either the second coupling half 18 and the ledge 15. Although the coupling assembly 10 is useful to quickly connect and disconnect a drive output shaft to and from an impeller shaft, it can also be used to quickly connect and disconnect other types of components in other types of devices.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system for a mixing assembly comprising:
   a housing;
   an impeller shaft extending into the housing;
   a first coupling half mounted to an end of the impeller shaft and having a disc shape with a top substantially flat surface and a bottom substantially flat surface;
   a powered drive system having an output shaft extending therefrom;
   a second coupling half mounted to the output shaft; and
   an orifice in the housing having an orifice diameter, wherein the orifice diameter is greater than the diameter of the second coupling half and smaller than the diameter of the first coupling half,
   wherein the first coupling half has a plurality of first locking pins extending upwardly from the disc top surface and disposed around a first distance from the center of the first coupling half, and a second set of drive pins extending upwardly from the disc top surface and disposed at a second distance from the center of the first coupling half,
   wherein the housing further comprises a ledge around the periphery of the orifice, said ledge having a plurality of passageways that can receive the first locking pins, and wherein the second coupling half has a plurality of holes that can receive the second drive pins, and
   wherein the assembly can be arranged in a first operative position at which the first and second coupling halves mate with each other via engagement of the second drive pins with the holes and wherein the disc top surface and the first locking pins are spaced below the ledge and the disc top surface and the first locking pins do not contact the ledge, and a second inoperative position at which the second coupling half is detached from the first coupling half and the first coupling half is supported in the housing by the ledge via engagement of the first locking pins with the passageways of the ledge,
   wherein in both the first operative and the second inoperative positions, the disc shaped first coupling half is arranged below the ledge.

2. The apparatus of claim 1, wherein the first coupling half has a first outer diameter and the second coupling half has a second outer diameter, and the first outer diameter is larger than the second outer diameter.

3. The apparatus of claim 1, wherein the first coupling half is integrally connected to an impeller shaft.

4. The apparatus of claim 1, wherein the second coupling half is integrally connected to a drive output shaft.

5. The apparatus of claim 1, wherein the first set of locking pins are disposed in a middle diameter and the second set of drive pins are disposed in an inner diameter.

6. The apparatus of claim 5, wherein the openings are correspondingly formed relative to the inner diameter.

7. A system for a mixing assembly comprising:
   a housing;
   an impeller shaft extending into the housing;
   a first coupling means mounted to an end of the impeller shaft and having a disc shape with a top substantially flat surface and a bottom substantially flat surface;
   a powered drive system having an output shaft extending therefrom;
   a second coupling means mounted to the output shaft; and
   an orifice in the housing having an orifice diameter, wherein the orifice diameter is greater than the diameter of the second coupling means and smaller than the diameter of the first coupling means,
   wherein the first coupling means has a plurality of first locking pins extending upwardly from the disc top surface and disposed around a first distance from the center of the first coupling means, and a second set of drive pins extending upwardly from the disc top surface and disposed at a second distance from the center of the first coupling means,
   wherein the housing further comprises a ledge around the periphery of the orifice, said ledge having a plurality of passageways that can receive the first locking pins, and wherein the second coupling means has a plurality of holes that can receive the second drive pins, and
   wherein the assembly can be arranged in a first operative position at which the first and second coupling means mate with each other via engagement of the second drive pins with the holes and wherein the disc top surface and the first locking pins are spaced below the ledge and the disc top surface and the first locking pins do not contact the ledge, and a second inoperative position at which the second coupling means is detached from the first coupling means and the first coupling means is supported in the housing by the ledge via engagement of the first locking pins with the passageways of the ledge, wherein in both the first operative and the second inoperative positions, the disc shaped first coupling half is arranged below the ledge.

8. The apparatus of claim 7, wherein the first coupling means has a first outer diameter and the second coupling means has a second outer diameter, and the first outer diameter is larger than the second outer diameter.

9. The apparatus of claim 7, wherein the second flanged portion overlaps a ledge portion of a shaft support member when the first coupling half is engaged to the shaft support member.

10. The apparatus of claim 7, wherein the first coupling means is integrally connected to an impeller shaft.

11. The apparatus of claim 7, wherein the second coupling means is integrally connected to a drive output shaft.

12. The apparatus of claim 7, wherein the first set of locking pins are disposed in a middle diameter and the second set of drive pins are disposed in an inner diameter.

13. The apparatus of claim 12, wherein the openings are correspondingly formed relative to the inner diameter.

* * * * *